Oct. 14, 1969  G. J. LAMOUREUX  3,471,915
APPARATUS FOR SELECTIVELY FEEDING AND
ASSEMBLING CARD COMPONENTS
OF DIFFERENT TYPES
Filed Dec. 30, 1966  7 Sheets-Sheet 1
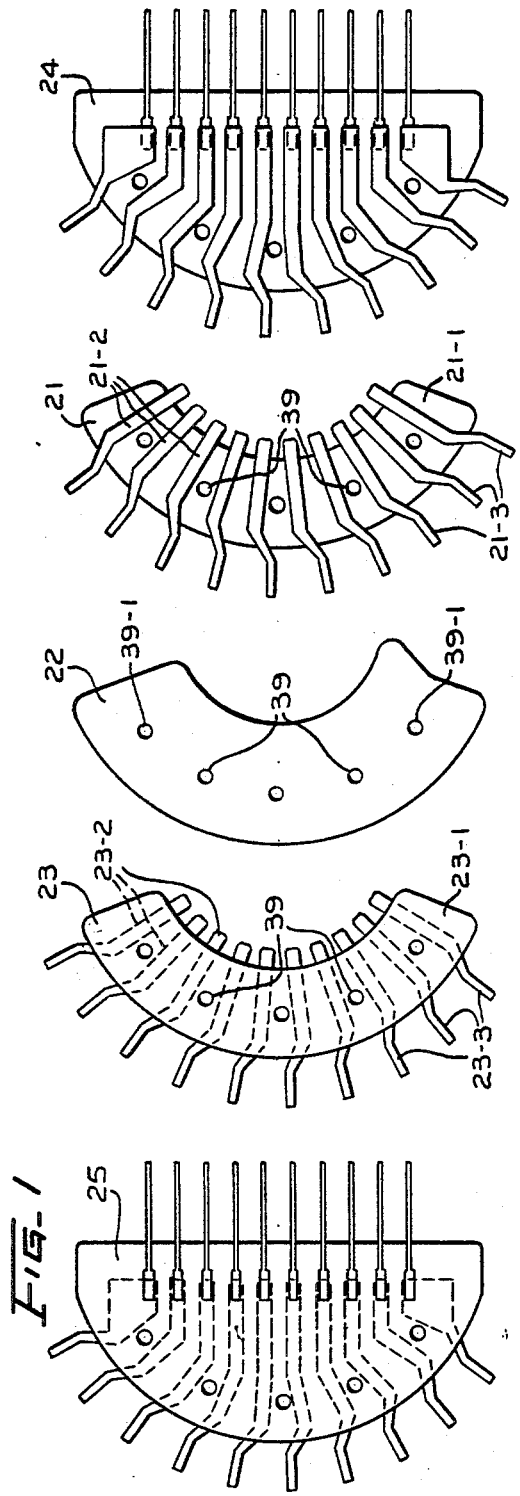
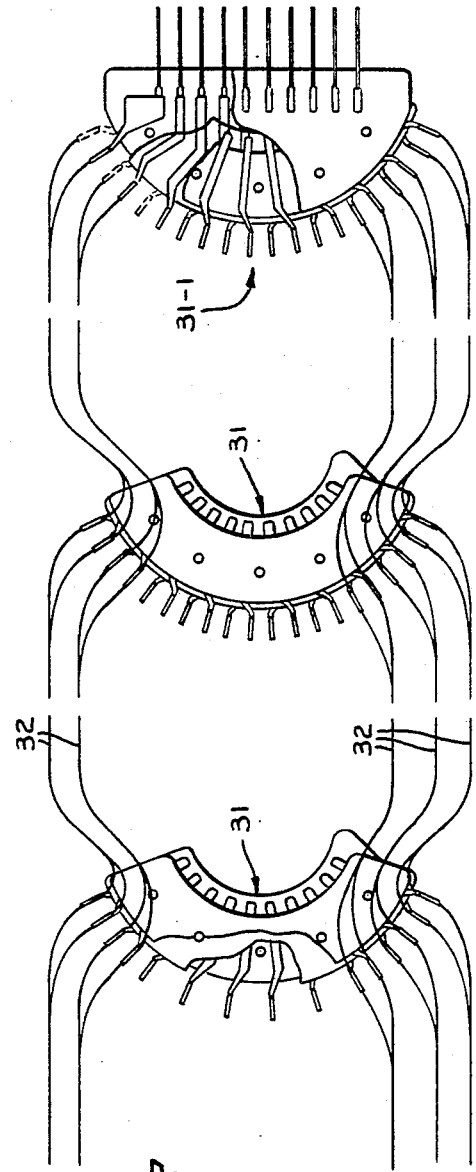
INVENTOR
G.J. LAMOUREUX
BY A. C. Schwarz, Jr.
ATTORNEY

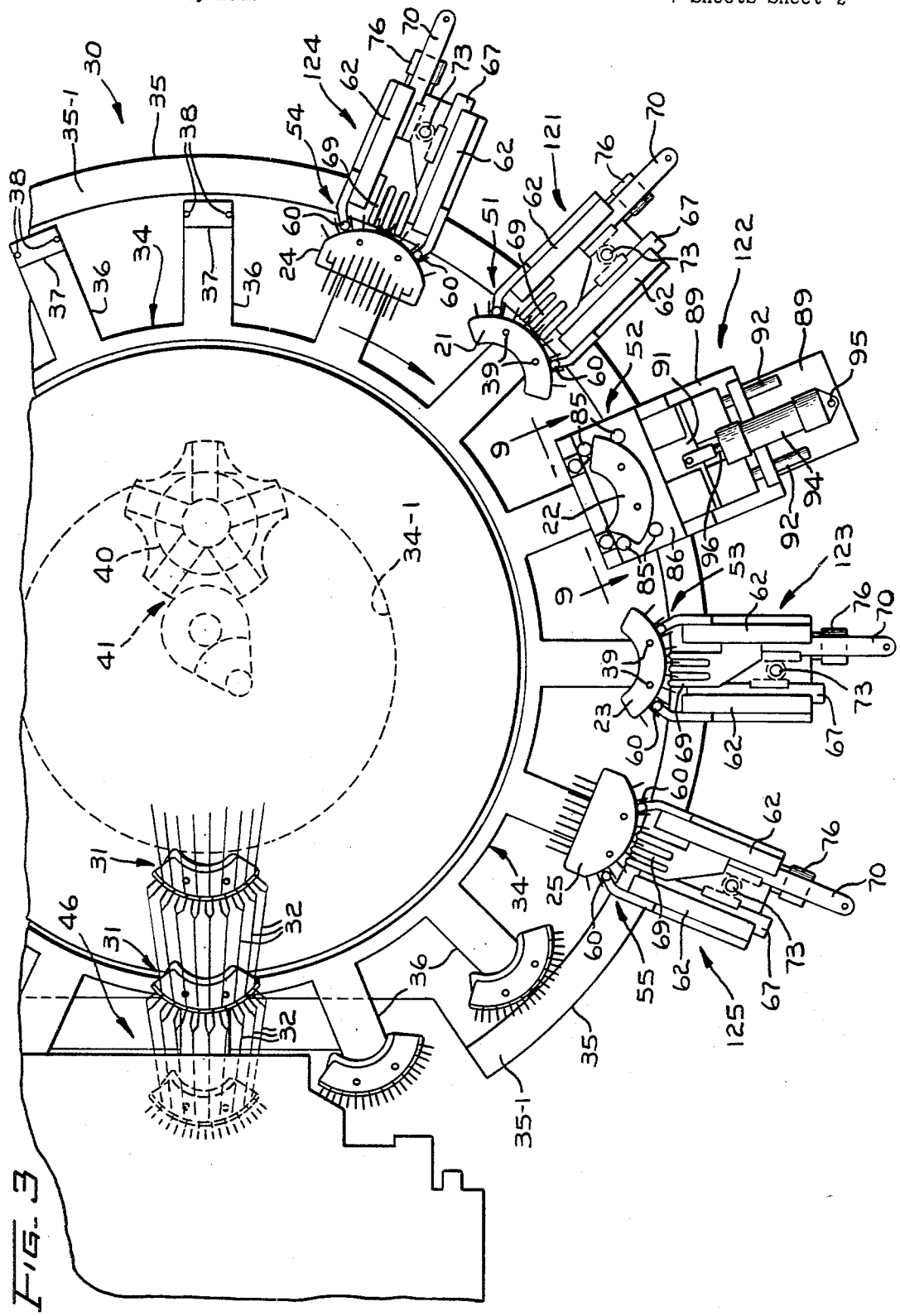

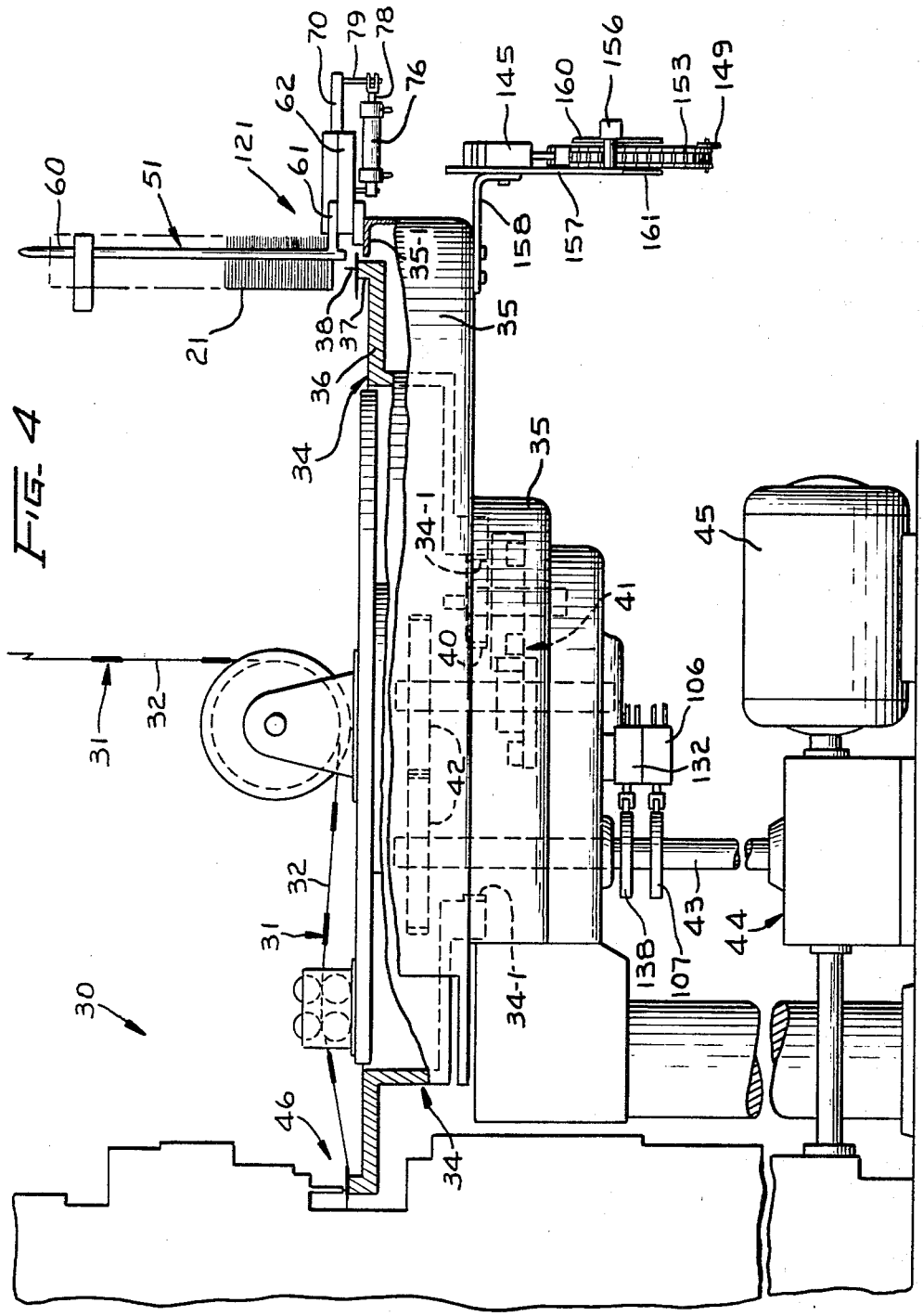

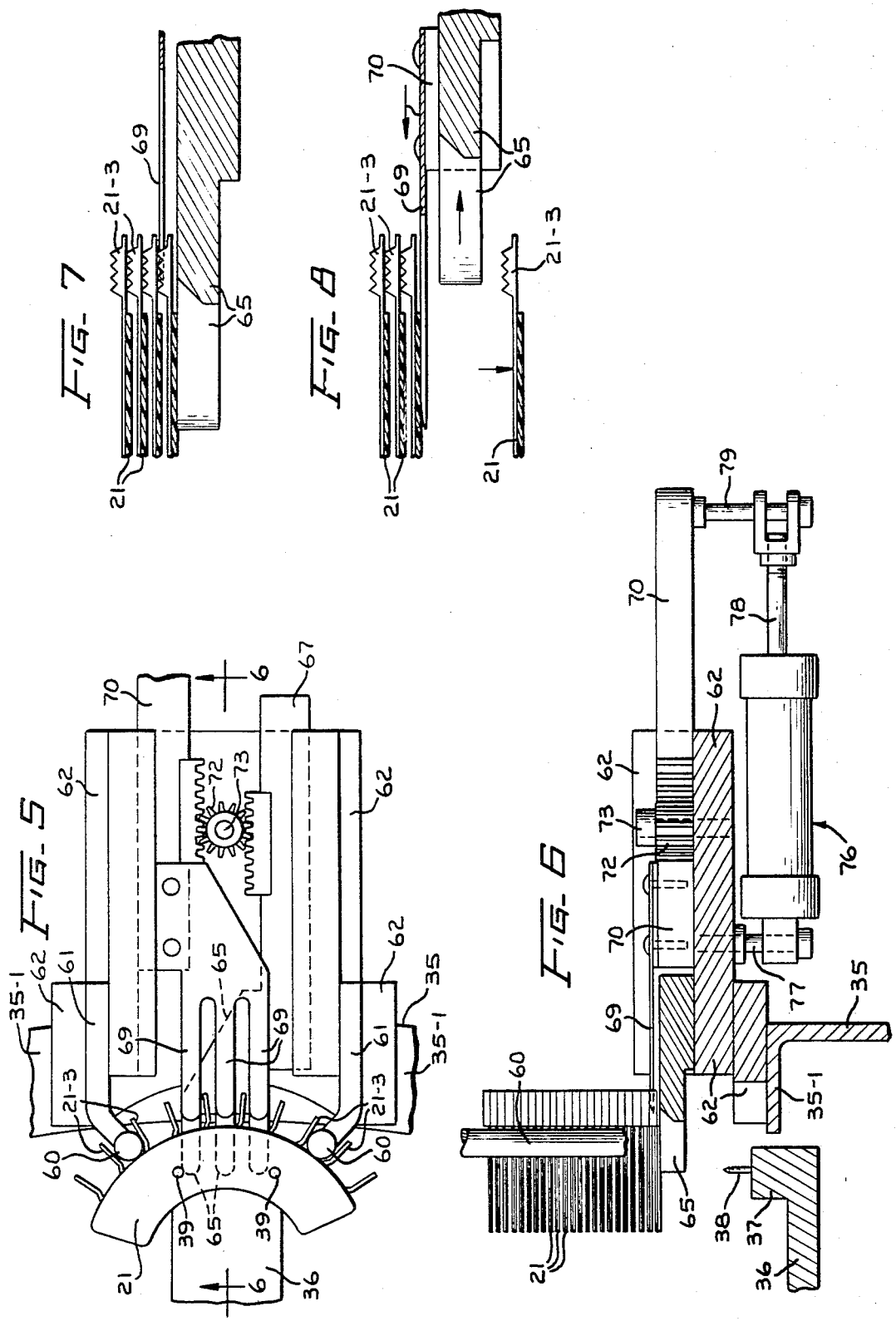

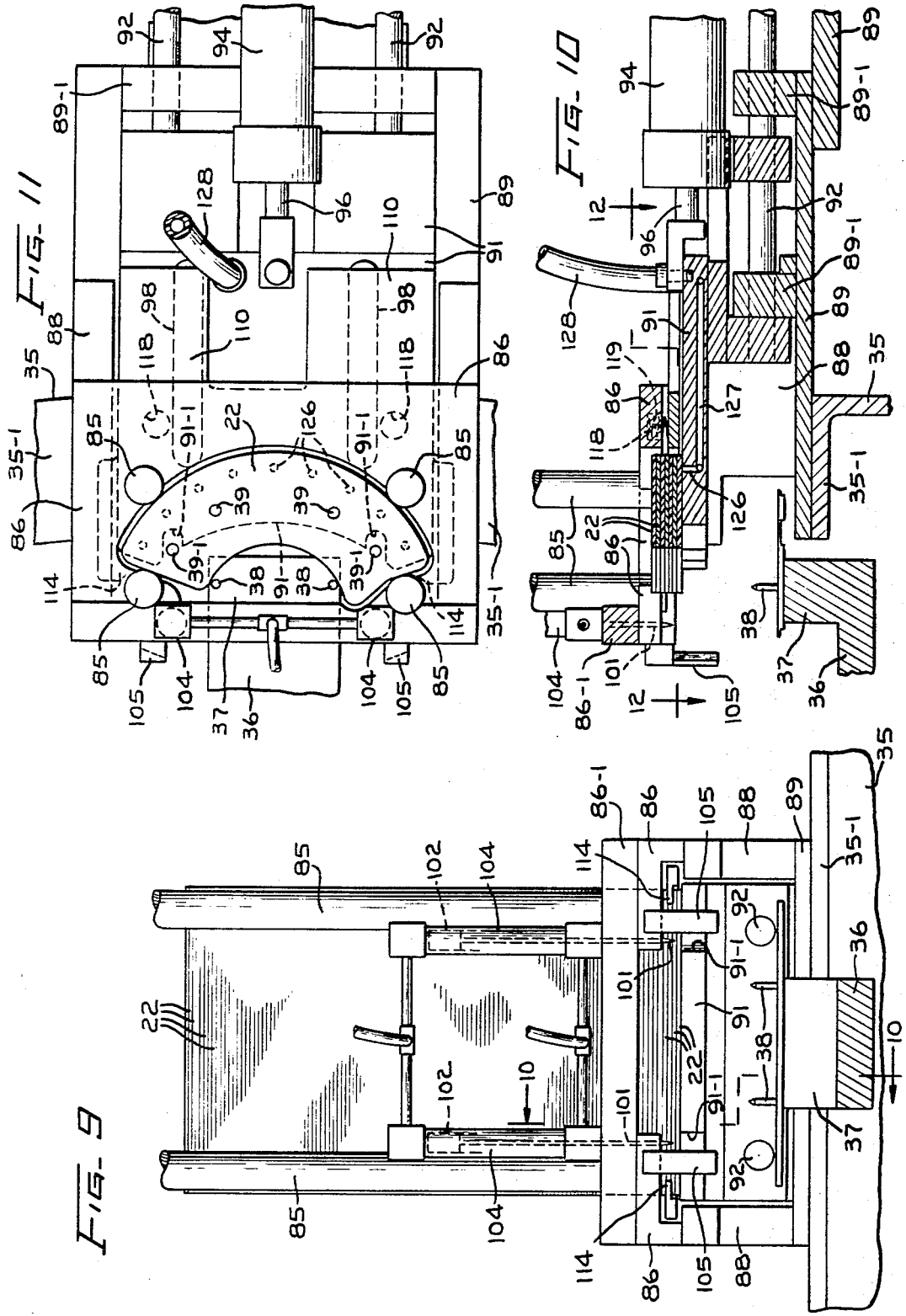

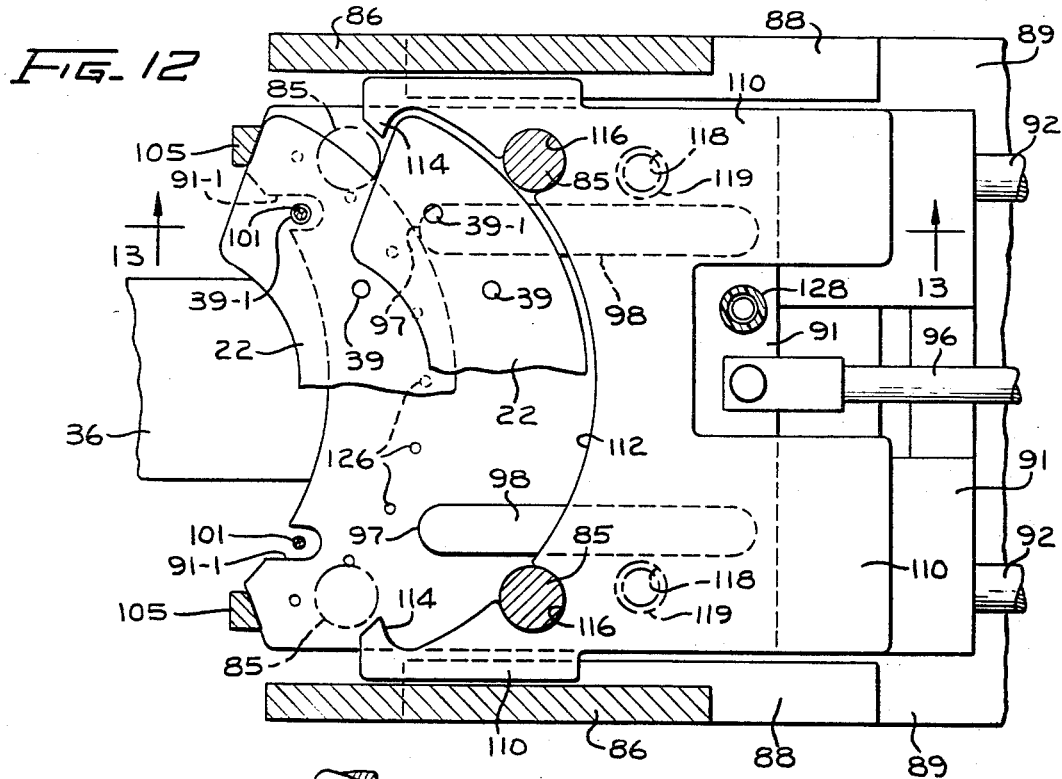
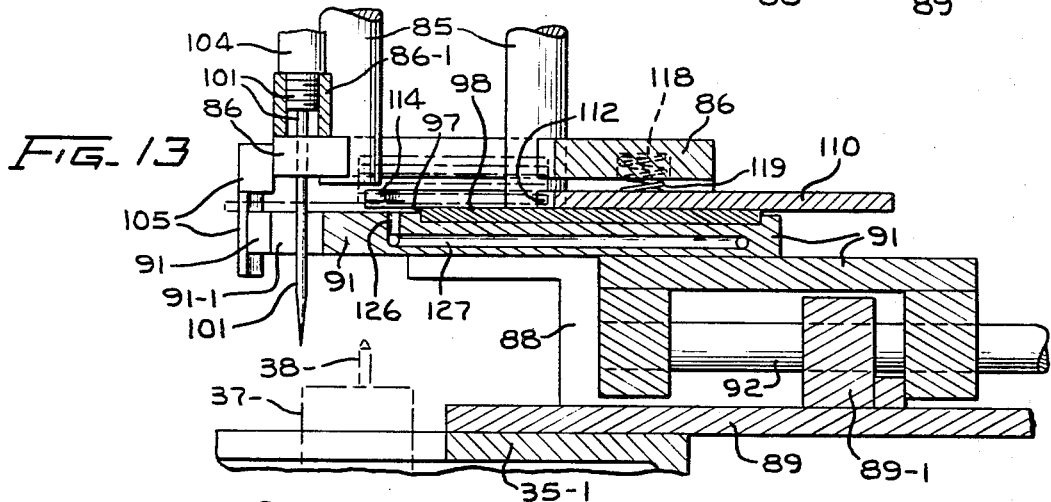
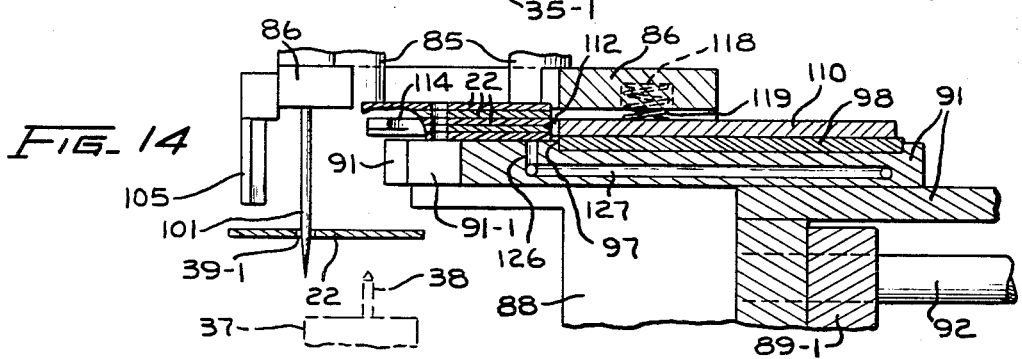

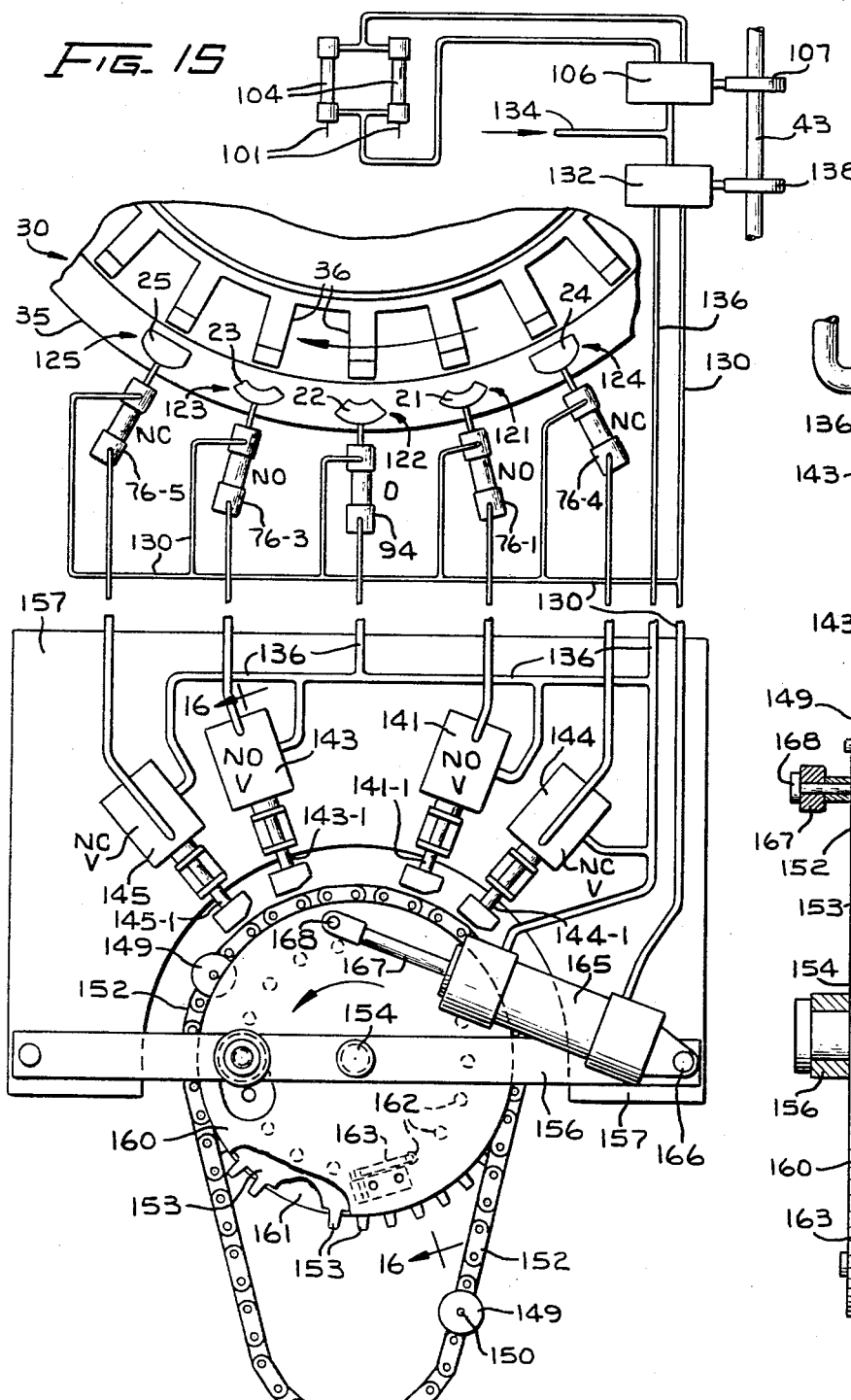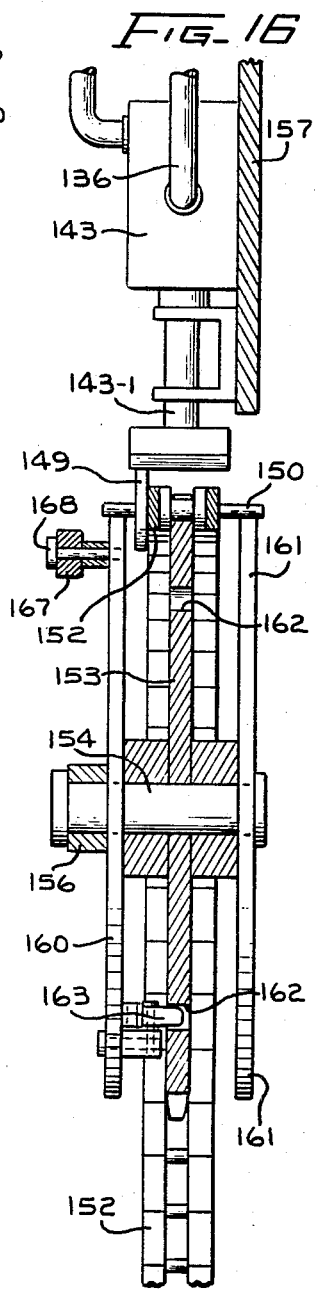

United States Patent Office 3,471,915
Patented Oct. 14, 1969

1

3,471,915
APPARATUS FOR SELECTIVELY FEEDING AND ASSEMBLING CARD COMPONENTS OF DIFFERENT TYPES
Gilbert J. Lamoureux, Oak Park, Ill., assignor to Western Electric Company, Incorporated, New York, N.Y., a corporation of New York
Filed Dec. 30, 1966, Ser. No. 606,088
Int. Cl. B23q 7/10
U.S. Cl. 29—203           15 Claims

ABSTRACT OF THE DISCLOSURE

Holders on a rotary carrier of the apparatus are indexed to a plurality of stations, some of which have normally operative mechanisms for feeding cards onto successive holders to form card assemblies, and other of which have normally unoperative mechanisms for feeding special cards. Conditioning mechanism operates cyclically at successive stations in synchronism with the indexing of the carrier to render the normally unoperative mechanisms operative to feed special cards onto a holder and form a special card assembly thereon, and to render the normally operable mechanisms unoperative to prevent the feeding of the other cards onto the holder.

---

This invention relates to apparatus for selectively feeding and assembling card components of various types and more particularly to apparatus for feeding terminal bearing cards of different types onto successive holders of a carrier to form card assemblies of different types.

In prior art apparatus for assembling terminal bearing card components of different types into card assemblies such as for example, that disclosed in Patent 2,708,459 issued to K. H. Andren et al. on May 17, 1955, three card components, including a terminal bearing card, a dielectric spacer card and a second terminal bearing card are fed into superposed assembled relation onto each of a plurality of holders on a carrier of the apparatus. Successive card assemblies are then carried to a station at which they are attached to a group of parallel wires in longitudinally spaced relation to each other by clinching the individual terminals of the card assemblies to the wires. The interconnected string of card assemblies are then severed at intervals to form ladders having a predetermined number of interconnected card assemblies thereon.

In a later and improved design of construction the endmost card assemblies of each ladder are of a special design to facilitate the electrical connection of the ladders into telephone switching apparatus. Consequently it is necessary to feed the special cards onto the holders at predetermined intervals in lieu of the regular cards.

It is an object of the present invention to provide an apparatus for selectively feeding and assembling cards of different types.

Apparatus illustrating certain features of the invention may include a rotary carrier having a plurality of holders thereon and a drive for indexing the carrier to advance the holders successively to a plurality of card feeding stations for receiving successive cards of various types thereon and then advancing the card assemblies to a clinching station where they are secured successively to a group of wires in spaced relation to each other longitudinally of the wires. At one of the stations normally operative mechanism is provided for feeding a card having terminals thereon from a stack of the cards onto a holder which is then indexed to the following station at which mechanism is provided for feeding a spacer card from a stack thereof onto the holder and the first card. Thereafter the holder is indexed to the following station at which normally operative mechanism is provided for feeding an upper card

2 with terminals thereon from a stack thereof onto the holder and the two cards thereon. Upon arrival at the clinching station the assembly of cards are attached to the wires.

A station disposed in advance of the aforementioned stations and another disposed following them are provided with stacks of special cards and normally unoperative mechanisms for feeding them onto the holders. The several card feeding mechanisms are selectively operable by control mechanism which, after a predetermined number of the regular card assemblies have been fed onto successive holders, renders the first special card feeding mechanism temporarily operable to feed a special card onto a holder, renders the first regular card feeding mechanism temporarily unoperative when the holder arrives thereat, permits the feeding of a spacer card onto the holder and the special card at the second regular card feeding station, renders the card feeding mechanism temporarily unoperative at the third regular card feeding station, and renders the second special card feeding mechanism temporarily operative to feed a second special card onto the holder and the spacer card and the first special card thereon. The assembly of the two special and the spacer card components when indexed to the clinching station is then attached to the wires.

Other objects, advantages and novel aspects of the invention will become apparent upon consideration of the following detailed description in conjunction with the accompanying drawings, in which:

FIG. 1 shows a group of regular and special cards which are assembled by the present apparatus into regular and special card assemblies;

FIG. 2 is a view of a portion of a ladder of interconnected regular and special card assemblies fabricated by the apparatus;

FIG. 3 is a fragmentary plan view of the apparatus for assembling the cards and attaching the assemblies thereof to interconnecting wires;

FIG. 4 is an elevational sectional view of the apparatus shown in FIG. 3;

FIG. 5 is an enlarged fragmentary plan view of the mechanism for feeding one type of card component onto holders of the apparatus;

FIG. 6 is a longitudinal sectional view of the card feeding mechanism taken on the line 6—6 of FIG. 5;

FIGS. 7 and 8 are enlarged fragmentary vertical sectional views showing, in different positions, the escapement mechanism for releasing successive cards from a stack thereof;

FIG. 9 is an enlarged vertical sectional elevational view taken along the line 9—9 of FIG. 3 showing the mechanism for feeding the spacer card;

FIG. 10 is a fragmentary vertical longitudinal sectional view of the feeding mechanism taken along line 10—10 of FIG. 9;

FIG. 11 is a plan view of the card feeding mechanism shown in FIG. 10;

FIG. 12 is an enlarged fragmentary plan sectional view of the card feeding mechanism taken on the line 12—12 of FIG. 10 and showing the card feeding slide in an advanced position;

FIG. 13 is a fragmentary vertical longitudinal sectional view of the card feeding mechanism taken on the line 13—13 of FIG. 12;

FIG. 14 is a fragmentary vertical sectional view similar to FIG. 13 showing the card feeding slide in a retracted position;

FIG. 15 is a diagrammatic view showing the mechanisms for effecting the selective feeding of the cards at the several stations onto the holders; and FIG. 16 is an enlarged vertical cross-sectional view through a portion of the control mechanism taken on the line 16—16 of FIG. 5 and showing an element of one of the valves actuated to a second position by a cam.

Referring to the drawings the present invention for selectively feeding and assembling different types of cards 21–25 (FIG. 1) is shown applied to an apparatus 30 (FIGS. 3 and 4) for attaching such assemblies 31 of the cards to a group of wires 32 (FIG. 2) at spaced points longitudinally thereof, as disclosed in the aforementioned patent. The apparatus comprises an annular carrier 34 suitably supported on a frame 35 for rotation about a vertical axis and having arms 36 extending radially therefrom and provided with holders 37 on the ends thereof. Each holder 37 has a flat upper surface for supporting cards thereon in a superposed relation to each other and has a pair of upwardly extending locating pins 38 which fit into apertures 39 in the cards for maintaining the components in aligned and assembled relation to one another.

The annular carrier 34 is provided with an internal ring gear 34–1 (FIG. 4) that meshes with a drive gear 40 of a Geneva drive 41. The latter is driven through a pair of gears 42 from a drive shaft 43 of a drive mechanism 44 including a motor 45 for operating the various mechanisms of the apparatus and for imparting step-by-step indexing movement to the carrier 34 for movement of successive holders 37 and the card assemblies 31 thereon to a clinching station 46.

As seen in FIG. 1 the card components 21 and 23, respectively, comprise arcuately shaped dielectric strips 21–1 and 23–1 having terminals 21–2 and 23–2 secured thereto. The spacer component 22 is an arcuately shaped dielectric separator strip interposed between the rows of terminals on the cards 21 and 23 of the card assemblies 31. The card assemblies comprising the components 21, 22 and 23, are advanced by the carrier 34 to the clinching station 46 of the apparatus in which successive card assemblies are attached to the wires 32 by clinching thereto the sleeve forming portions 21–3, 23–3 of the terminals. The apparatus 30 advances the wires 32 and the card assemblies secured thereto in timed relation to the attachment of successive card assemblies to the wires. Sections of the interconnected cards and wires are later severed to form ladders having a predetermined number of card assemblies therein.

Stacks of the cards 21, 22 and 23 (FIG. 3) are supported respectively in magazines 51, 52, 53 at stations 121, 122, and 123 of the apparatus above holders 37 of the carrier 24. Stacks of special cards 24 and 25 for the card assemblies at one end of the ladders, respectively, are likewise supported in magazines 54 and 55 at stations 124 and 125 located, respectively, adjacent to and before and after the stations 121 and 123.

The sleeve forming portions 21–3 and 23–3 of the terminals 21–2 and 23–2 (FIGS. 7 and 8) serve to support the stacked cards 21 and 23, respectively, in vertically spaced relation to one another.

Referring to FIGS. 3–6 the magazines 51, 53–55, for the terminal bearing cards 21, 23–25, each comprises a pair of vertically disposed rods 60 adapted to fit between the projecting sleeve forming portions 21–3 etc. of adjacent terminals on the cards for guiding the cards vertically to the lower end of the rods and onto the holder 37 therebeneath so that the locating pins 38 of the holder 37 fit into the locating apertures 39 of the cards. The rods 60 of each magazine have arms 61 (FIGS. 4 and 5) which are secured to a supporting block 62 that is mounted on the flange 35–1 of the frame member 35.

At stations 121, 123, 124 and 125 feeding devices are provided in the form of escapement mechanisms for transferring the cards from the magazines onto the holders 37 therebelow. The lowermost card of each stack at such stations rests on the slotted end portion of a flat escapement member 65 which is secured to one end of a slide bar 67 (FIGS. 5–8). The latter is mounted for longitudinal movement on the supporting block 62. A thin flat second escapement member 69 is provided for movement between the lowermost and the adjacent card for supporting the remainder of the cards of the stack while the first escapement member 65 is withdrawn to release the lowermost card.

The second escapement member 69 is secured to a slide bar 70 mounted on the supporting block 62 for reciprocable movement parallel to the slide bar 67. Racks on the slide bars 67 and 70 mesh with opposite sides of a gear 72 that is rotatable about a fixed pin 73 and moves the slide bars 67, 70 and the flat escapement members 65 and 69 in opposite directions.

Reciprocable movement is imparted to the escapement members 65 and 69 of the card feeding devices by an actuator 76 (FIG. 6) which is operated by compressed air power and connected at 77 to the supporting block 62 and has a piston rod 78 that is connected at 79 to the one end of the slide bar 70. In response to one complete reciprocation of the piston rod 78 the first escapement member 65 is withdrawn to allow the release of the lowermost card component, and simultaneously with the withdrawal of the first escapement member 65, the second escapement member 69 is moved to its forward position to support the adjacent card component and the stack of card components thereabove. As the first escapement member is returned to its forward position the second escapement member is withdrawn to allow the stack of cards to be lowered onto the first escapement member.

The magazine 52 (FIGS. 3, 9–14) for holding a stack of spacer cards 22 comprises four parallel vertically disposed rods 85 mounted at the lower ends in a horizontal plate 86 in spaced relation to each other for guiding the cards for vertical movement. The plate 86 has an opening for movement of the cards therethrough and is mounted on a pair of vertically disposed supporting members 88 (FIG. 9) which are secured to a platform 89 fixed to the frame member 35–1 of the apparatus.

The stack of spacer cards 22 rests on the flat upper surface of a slide 91 of a card feeding device for transferring the cards, respectively, from the magazine to the holders 37. The slide 91 is carried by a pair of horizontally disposed rods 92 which are supported for horizontal movement in guides 89–1 on the platform 89. Reciprocatory movement is imparted to the slide by an actuator 94 operated by compressed air power. The actuator 94 is connected at 95 to the platform 89 (FIG. 3) and has a piston rod 96 connected to the slide 91.

Shoulders 97 (FIGS. 12–14) formed by the leading ends of the raised portions of a pair of elongated inserts 98 on the slide 91 engage the rear edge portion of the lowermost spacer card 22 and move the card horizontally beneath the lower ends of two of the rods 85 of the magazine 53 and from the remainder of the stack of cards 22 to a predetermined forward position (FIG. 12) in vertical alignment with the holder 37 therebelow. With the card 22 in its forward position the aligning apertures 39 thereof are in vertical alignment with the aligning pins 38 of the holder 37, and a second pair of aligning apertures 39–1 (FIGS. 1, 11 and 12) of the card component are disposed below and in vertical alignment with a pair of vertically movable guide pins 101.

The pins 101 are carried by pistons 102 (FIG. 9) which are slidable in cylinders of vertically disposed fluid operated actuators 104 mounted on a bar 86–1 secured on the horizontal plate 86. Compressed air supplied to opposite ends of the actuators 104 under control of a valve 106 (FIG. 15) and a cam 107 on the drive shaft 43 impart reciprocation to the guide pins 101. Following the movement of the slide 91 and the card 22 to the forward position, the guide pins 101 are lowered through the apertures 39–1 in the card 22 to a predetermined lower position. As the slide 91 is returned to its retracted position, the card 22 is removed therefrom and is guided on the pins 101 downwardly onto the holder 37 and the pins 38 thereon in properly aligned relation thereto. The forward portion of the slide 91 is provided with clearance slots 91–1 (FIG. 12) for the pins 101. A pair of stops 105 may be mounted on the magazine to prevent over-travel of the card component 22 during its movement to the forward position.

The spacer cards 22 are relatively thin and in order to insure that only one of them is fed at a time an improved gaging mechanism is provided therefor. The mechanism includes a flat gage plate 110 which rests on the slide 91. In the embodiment shown the gage plate rests on the flat upper surface of the inserts 98 of the slide 91. The forward portion of the gage plate 110 is shaped to provide a curved surface 112 for receiving the spacer cards therein and to provide gaging fingers 114 directed inwardly from opposite sides of the gage plate around opposite ends of the spacer cards 22. The gaging fingers 114 cooperate with the forwardly disposed magazine rods 85 to prevent horizontal movement of the cards 22 from the magazine except the lowermost card of the stack. The card feeding shoulders 97 projects upwardly above the upper surface of the slide 91 a distance slightly less than the thickness of the card 22, and the gaging fingers 114 are undercut slightly to provide a gate or gaging space of a predetermined distance between the fingers 114 and the upper surface of the slide 91 for movement therethrough of only the lowermost card 22 of the stack.

Two of the magazine rods 85 project below the stationary supporting plate 86 and fit into recesses 116 in the gage plate 110 and serve to hold the latter against horizontal displacement. A pair of springs 118 seated in recesses 119 in the supporting plate 86 yieldably maintain the gage plate 110 in engagement with the upper surface of the inserts 98 of the slide so that the gaging fingers 114 remain in a predetermined spaced relation to the slide and provide a predetermined clearance therebetween for the feeding of only a single spacer component therethrough.

Suction is applied to the spacer card 22 through a plurality of ports 126 in the slide 91 to maintain the card in engagement with the upper surface of the slide during the feeding operation. The ports 126 communicate through suitable passageways 127 with a flexible tubing 128 which is connected to a vacuum line.

As shown diagrammatically in FIG. 15 the actuators 76–4, 76–1, 94, 76–3, and 76–5 associated with the component feeding devices at stations 124, 121, 122, 123, and 125, respectively, are connected at one end by first lines 130 to a reversible control valve 132 and to a supply line 134 of compressed air and are actuated thereby to their normal retracted positions. The actuator 94 is connected at its other end to a second line 136 to the control valve 132. This valve is actuated by a cam 138 on the drive shaft 43 for a relatively short period of time between successive indexing movements of the carrier 34 to reverse the flow of air to the actuator and effect the movement of the slide 91 and the spacer component 22 to the forward position. As the control valve 132 is returned to its normal position air flow is again reversed and the actuator returns the slide 91 to the normal retracted position.

The actuators 76–1 and 76–3 are connected at the other ends to the second line 136 through conditioning elements in the form of valves 141 and 143, respectively. These valves are urged to a normal open position and render the actuators associated therewith normally operative to feed card components from the stations onto the respective holders in response to the passage of compressed air through the valves 141 and 143 to the actuators 76–1 and 76–3. The valves 141 and 143, respectively, are adapted to be actuated to a closed position in response to movement of rods 141–1 and 143–1, respectively, of the valves by a cam 149 in the form of a roller moved cyclically through a predetermined path as will be described more fully hereinafter. The other ends of the actuators 76–4 and 76–5 are connected to the line 136 through conditioning valves 144 and 145, respectively, which are movable to and from a normal closed first position and an open second position.

From an inspection of the FIG. 15 it will be noted that the conditioning valves 144, 141, 143, and 145 are disposed in spaced relation to one another corresponding to that of the station 124, 121, 123, and 125.

During a normal cycle of operation of the apparatus for assembling the cards 21, 22, 23, a holder 37 is indexed to station 124 and inasmuch as the actuator 76–4 thereat is rendered unoperative by the normally closed conditioning valve 144 no card is fed onto the holder. During the next cycle of operation the holder 37 is indexed to station 121 and the operative actuator 76–1 effects the feeding of the card 21 onto the holder. During the following cycle of operation the holder 37 with the card 21 thereon is indexed to station 122 and the actuator 94 effects the feeding of a spacer card 22 onto the holder and the card 21 thereon. The holder 37 is then indexed to station 123 and the card 23 is fed thereonto and onto the superposed cards 21 and 22 by the operative actuator 76–3 during the following cycle of operation. The holder 37 with the components 21, 22, and 23 thereon is advanced to station 125 where no component is fed onto the holder by the unoperative actuator 76–5 during the next cycle of operation.

Subsequently, with the holder 37 at station 46 the card assembly 31 of the three superposed cards 21, 22, 23 supported by the holder is attached to the wires 32 to form a portion of a ladder of interconnected card assemblies 31.

After the prescribed number of the regular card assemblies 31 have been fed onto a corresponding number of holders 37, the special cards 24 and 25 are fed sequentially onto the following holder in lieu of the regular cards 21 and 23 to form a special card assembly 31–1 (FIG. 2) for the end of the ladder section. This is effected by the cam 149 which is indexed in timed relation to the carrier 34 for actuating the conditioning valves 144, 141, 143 and 145 sequentially from the normal first position to the second position in timed relation to the movement of the holder through the stations 124, 121, 123 and 125.

The cam 149 is supported on a pin 150 (FIG. 16) which extends through a link of an endless link chain 152 that is trained around a sprocket 153. The sprocket is rotatably supported on a shaft 154 which is secured to an intermediate portion of a bar 156 that is removably affixed at its ends to a vertical mounting plate 157. The latter is attached to the frame 35 by brackets 158 (FIG. 4). The end portions of the cam supporting pin 150 during a portion of their travel, engage and are supported on the periphery of a pair of discs 160 and 161 which are rotatably supported on the shaft 154 on opposite sides of the sprocket 153.

Apertures 162 are formed in a circular row in the sprocket 153 in angularly spaced relation to each other corresponding to the angular spacing of the conditioning valves 144, 141, 143 and 145 on the mounting plate 157. The apertures 162 cooperate with a ratchet pawl 163 that is pivotally mounted at one end on the disc 160 and is spring urged for movement of the other end thereof into successive apertures 162 to effect the indexing of the sprocket 153 in response to oscillatory movement of the disc 160 by a fluid operated actuator 165. The latter is pivotally supported at 166 on the mounting plate 157 and has a piston rod 167 pivotally connected at 168 to the disc 160.

The actuator 165 is connected to the airline 130 and 136 and operates to index the chain 152 and the cam 149 step-by-step in synchronism with the carrier 34. Thus for each cycle of operation of the apparatus 30, the carrier 34 and the cam 149 are indexed one step. The chain 152 is replaceable with chains of various lengths to provide for the fabrication of ladders of various lengths. As shown herein the chain is provided with two cams 149.

After a predetermined number of cycles of operation of the apparatus during which the regular components 21, 22, and 23 are fed sequentially onto successive holders, the cam 149 is indexed into engagement with the conditioning valve 144 and actuates it from the normally closed to the open position. This renders the normally unoperative actuator 76–4 operative to feed a special card 24 onto the holder 37 at station 124 while simultaneously therewith cards 21, 22, and 23 are being fed onto other holders at stations 121, 122, and 123. During the next cycle of operation and in response to the next indexing movement the cam 149 disengages the conditioning valve 144 which is then restored to normally closed position and the cam 149 engages and actuates the normally open conditioning valve 141 to closed position. Thus no cards are fed at stations 124 and 121 while cards 23 and 22 are fed at stations 123 and 122 during this cycle of operation.

During the following cycle of operation the holder with the special card 124 thereon is advanced from station 121 to station 122 where a card 22 is fed thereonto while cards 21 and 23 are fed at stations 121 and 123, respectively, and during which the cam 149 is positioned between the valves 141 and 143. During the next cycle of operation the cam 149 actuates the valve 143 from a normally open to a closed position and thus renders the actuator 76–3 unoperative to feed a card at station 123 while cards 21 and 22 are being fed at stations 121 and 122 respectively.

During the following cycle of operation the cam 149 disengages the valve 143 which is restored to its normal open position and the cam actuates the conditioning valve 145 from its normally closed to its open position thereby rendering the actuator 76–5 operative to feed a special card component 25 onto the holder at station 125 and onto spacer component 22 and the special component 24 thereon to form a special card assembly 31–1, while card components 23, 22, and 21 are fed at stations 123, 122 and 121 respectively. The special card assembly upon arrival at station 46 is attached to the group of wires 32.

From the foregoing disclosure it will be apparent that a novel and effective apparatus has been provided for feeding regular card components onto successive holders to form regular card assemblies, and for selectively feeding special card components to form special card assemblies in lieu of the regular card assemblies.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for assembling components on a moving carrier from a plurality of supply facilities, located along the path of movement of said carrier, the improvement which comprises:
   means associated with each supply facility for advancing a component onto the carrier;
   means for cyclically moving the carrier;
   means rendered effective following each cyclic movement of the carrier for operating a first said advancing means;
   means rendered effective following each cyclic movement of the carrier for operating a second of said advancing means;
   means rendered effective after a predetermined number of cyclic movements of said carrier for operating a third of said advancing means; and
   means rendered effective after an additional predetermined number of cyclic movements of said carrier for interrupting operating of said second advancing means.

2. An apparatus for feeding and assembling parts of different kinds comprising:
   a carrier having a plurality of holders, respectively, for supporting a plurality of parts thereon;
   means for indexing said carrier to advance said holders successively to a plurality of stations;
   means at each of said stations for supporting a stack of parts above the holder thereat;
   means individual to said stations for feeding the parts onto the holders thereat;
   wherein the improvement comprises the combination therewith of:
   conditioninng means individual to said feeding means urged to a normal first position and being movable to and from the first position and a second position for rendering said feeding means, respectively, either operative or unoperative, said conditioning means being set to render some of said feeding means normally operative and others normally unoperative;
   control means operable in timed relation to the indexing of said carrier and at selectively spaced cyclical intervals for effecting the shifting of said feeding means at successive stations from said normal condition to the other condition in timed relation to the movement of one of said holders successively at said stations; and
   means operable between successive indexing movements of said carrier to effect the operation of said operative feeding means.

3. An apparatus as defined in claim 2 wherein said control means comprises:
   an element for actuating said conditioning means, respectively, from the first position to the second position;
   means for supporting said element for cyclical movement into engagement successively with said conditioning means; and
   means for indexing said element supporting means in timed relation to the indexing of said carrier to effect the actuation of said conditioning means at successive stations from the normal first position to the second position in synchronism with the movement of a holder to the corresponding stations.

4. An apparatus for feeding and assembling cards of different kinds comprising:
   a carrier having a plurality of holders, respectively, for supporting a plurality of cards thereon in superposed relation;
   means for indexing said carrier to advance said holders successively to a plurality of stations;
   means individual to said stations for supporting a stack of cards above the holder thereat;
   means including fluid operated actuators at said stations, respectively, for feeding the cards onto the holders thereat; and
   the combination therewith of:
   conditioning valves, individual to said actuators and disposed in spaced relation to one another corresponding to the spacing of said stations; said conditioning valves, respectively, being used to a normal first position and being movable to and from said first position and a second position for rendering said actuating means either operative or unoperative, and being set to render some of said actuators normally operative and others normally unoperative;
   means operable during the interval between successive indexing movements of said carrier for supplying fluid under pressure to said operative actuators to effect the feeding of cards thereby onto the holders aligned therewith;
   an element for actuating said conditioning valves from the first position to the second position;
   a second carrier for supporting said element for cyclical movement into engagement with said conditioning valves; and
   means for indexing said second carrier in timed relation to the indexing of said first mentioned carrier to effect the actuation of said conditioning valves at successive stations by said element from the normal first position to the second position in synchronism with the movement of a holder to the corresponding stations.

5. The apparatus as defined in claim 4 wherein said second carrier is an endless chain.

6. An apparatus of the type described which comprises:
   a carrier having a plurality of holders, respectively, for supporting a plurality of parts thereon;
   means for indexing said carrier to advance said holders successively to a plurality of stations;
   magazines, respectively, for selected ones of said stations for supporting a stack of parts above the holders thereat; and
   means individual to said magazines at said selected stations for feeding the parts onto said holders thereat;
wherein the improvement comprises the combination therewith of:
   magazines, respectively, at the other stations for supporting a stack of special parts above said holders thereat;
   means individual to said magazines at said other stations for feeding the special parts onto said holders thereat;
   conditioning means individual to said feeding means at said selected stations urged to a normal first position for rendering said feeding means operative and being movable to a second position for rendering said feeding means unoperative;
   conditioning means individual to said feeding means at said other stations urged to a normal first position for rendering said feeding means normally unoperative and movable to a second position for rendering said feeding means operative;
   means operable in timed relation to the indexing of said carrier for effecting the shifting of said feeding means at successive stations from said normal condition to the other condition in timed relation to the movement of one of said holders to successive stations; and
   means operable between successive indexing movements of said carrier for effecting the actuation of said operative feeding means, respectively.

7. An apparatus of the type described which comprises:
   a carrier having a plurality of holders, respectively, for supporting a plurality of parts thereon;
   means for indexing said carrier to advance said holders successively to a plurality of first stations and second stations;
   magazines, respectively, at the first stations for supporting stacks of parts above the holders thereat;
   means individual to said magazines at said first stations for feeding the parts onto said holders thereat; and
   actuators, respectively, for said feeding means at said first stations;
wherein the improvement comprises the combination therewith of:
   magazines, respectively, at the second stations for supporting stacks of special parts above said holders thereat;
   means individual to said magazines at said second stations for feeding the special parts onto said holders thereat;
   actuators, respectively, for said feeding means at said second stations;
   conditioning means individual to said actuators at said first stations urged to a normal first position for rendering said actuators operative and being movable to a second position for rendering said actuators unoperative;
   conditioning means individual to said actuators at said second stages urged to a normal first position for rendering said actuators normally unoperative and movable to a second position for rendering said actuators operative;
   an element for actuating said conditioning means from the first position to the second position;
   a second carrier for supporting said element for cyclical movement into engagement with said conditioning means;
   means for indexing said second carrier in timed relation to the indexing of said first mentioned carrier to effect the actuation of said conditioning means at successive stations by said element from the normal first position to the second position in synchronism with the movement of one of said holders to the corresponding stations; and
   means operable between successive indexing movements of said carrier for effecting the actuation of said operative actuators.

8. An apparatus of the type defined in claim 6 wherein the parts being assembled are in the form of cards, each having a pair of perforations therein and wherein at least one of said card feeding means comprises:
   a slide mounted for horizontal movement below the stack of cards and having an upper surface for supporting the stack of cards and provided with a shoulder engageable with the edge of the lowermost card for imparting movement thereto;
   means for reciprocating said slide in timed relation to the indexing of said carrier to effect the movement of the lowermost card from the stack to a forward position above and in alignment with said holder thereat;
   a pair of vertically disposed guide pins;
   means mounted above said slide and adjacent said magazine thereat for moving said guide pins vertically to and from a normal upper position at a level above the lowermost card and in alignment with the apertures therein when the card is in the forward posietion and for movement into the apertures thereof to a lower position; and
   means operable in timed relation to the movement of said slide to effect the movement of said guide pins into the apertures of the card when the latter is in the forward position for holding the card during the return movement of said slide and for guiding the card downwardly onto said holder.

9. An apparatus for feeding cards having apertures therein which comprises:
   means for supporting a stack of cards in a predetermined position;
   a card holder;
   means for moving said card holder to a predetermined position below and adjacent to said supporting means and the stack of cards therein;
   a slide mounted for horizontal movement below the stack of cards and having an uper surface for supporting the cards and provided with a shoulder engageable with an edge of the lowermost card for imparting movement to the card;
   means for reciprocating said slide to effect the movement of the lowermost card from the stack to a forward position above and in alignment with said holder;
wherein the improvement comprises the combination therewith of:
   a vertically disposed guide;
   means mounted adjacent to said first mentioned means for moving said guide vertically to and from a normal upper position at a level above the lowermost card and in alignment with the aperture thereof when the card is in the forward position and for movement into the aperture thereof to a lower position; and means operable in timed relation to the movement of said holder for controlling the operation of said slide actuating means and said guide actuating means to effect the movement of said guide member into the aperture of the card when the latter is in the forward position for holding the card during the return movement of said slide and for guiding the card downwardly onto said holder.

10. An apparatus as defined in claim 9 including the provision of:

vacuum means on said slide for urging the lowermost card of the stack against the upper surface of said slide.

11. An apparatus for feeding cards which comprises:

magazine means for receiving a stack of cards;

a slide mounted beneath said magazine means having a flat upper surface engageable with the lowermost card for supporting the stack of cards and having a shoulder engageable with the edge of the lowermost card for effecting the movement thereof with the slide; and means for reciprocating said slide transversely of said magazine means to effect the movement of the lowermost card from said magazine means;

wherein the improvement comprises the combination therewith of:

a gage plate resting on said slide and having an opening therethrough for movement of the cards into engagement with the slide and having card retaining and gaging portions thereof provided with a lower surface spaced a predetermined distance from the upper surface of said slide for movement therebeneath of only the lowermost card of the stack; and means for supporting said gage plate for free movement into engagement with said slide and against reciprocatory movement therewith.

12. The apparatus as defined in claim 11 including the provision of:

resilient means for urging said gage plate into engagement with said slide.

13. In an apparatus for dispensing components on a carrier from a plurality of different supply facilities, which comprises:

means for cyclically moving the carrier;

first means associated with certain of said supply facilities for advancing components onto the carrier;

second means associated with other supply facilities for advancing components onto the carrier;

means controlled by said carrier-moving means and operated between cyclic movements of said carrier for cyclically actuating said first and second advancing means;

means interposed between said actuating means and said first advancing means for interrupting operation of said first advancing means;

means interposed between said actuating means and said second advancing means for initiating operation of said second advancing means; and means cyclically operated by said actuating means for activating said initiating means after a predetermined number of cyclic movements and for activating said interrupting means after an additional predetermined number of cyclic movements.

14. In an apparatus as defined in claim 13 wherein:

said interrupting means includes normally-open valve means for controlling and operating said first advancing means;

said initiating means include normally-closed valve means for controlling and operating said second advancing means; and said activating means includes at least one valve operating member and means for moving said valve operating member into position to open said normally-closed valve and then into position to close said normally-open valve to initiate and interrupt actuation of said first and second advancing means.

15. In an apparatus as defined in claim 13 further including:

third means associated with at least one additional supply facility and actuated between every cyclic movement of said carrier for advancing additional components onto the carrier.

References Cited

UNITED STATES PATENTS

| | | | |
|---|---|---|---|
| 1,982,902 | 12/1934 | Clark | 221—119 |
| 2,708,459 | 5/1955 | Andren et al. | 140—1 |
| 3,292,249 | 12/1966 | Banke | 29—211 |

THOMAS H. EAGER, Primary Examiner

U.S. Cl. X.R.

29—211; 221—112